US012650819B2

(12) United States Patent
Procopio et al.

(10) Patent No.: US 12,650,819 B2
(45) Date of Patent: Jun. 9, 2026

---

(54) NO-CODE DATA DRIVEN WORKFLOWS USING EXTERNAL DATA TRIGGERS

(71) Applicant: Google LLC, Mountain View, CA (US)

(72) Inventors: Michael Jeffrey Procopio, Boulder, CO (US); Rachel Goodman Moore, Kirkland, WA (US); Sarmad Hashmi, San Jose, CA (US); Mark Edward Collins, Louisville, CO (US); Francis Herrera Cortez, San Bruno, CA (US); Nicholas Eric Westbury, Seattle, WA (US); Dan Bahir, San Jose, CA (US); Lusha Wang, Mountain View, CA (US); Maria Castaneda Laris, San Francisco, CA (US)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 18/628,375

(22) Filed: Apr. 5, 2024

(65) Prior Publication Data

US 2025/0315220 A1      Oct. 9, 2025

(51) Int. Cl.
| | |
|---|---|
| *G06F 8/34* | (2018.01) |
| *G06F 8/60* | (2018.01) |
| *H04L 51/224* | (2022.01) |

(52) U.S. Cl.
CPC .................. *G06F 8/34* (2013.01); *G06F 8/60* (2013.01); *H04L 51/224* (2022.05)

(58) Field of Classification Search
None
See application file for complete search history.

(56) References Cited

U.S. PATENT DOCUMENTS

| | | | |
|---|---|---|---|
| 10,466,981 | B1 | 11/2019 | MacMillan et al. |
| 10,656,907 | B2 | 5/2020 | Seolas |

(Continued)

FOREIGN PATENT DOCUMENTS

| | | |
|---|---|---|
| CN | 108090035 A | 5/2018 |
| CN | 116414368 A | 7/2023 |

OTHER PUBLICATIONS

Avishahar-Zeira et al., "Could No-Code Be Code? Toward a No-Code Programming Language for Citizen Developers," ACM, 2023. (Year: 2023).*

(Continued)

*Primary Examiner* — Ryan D. Coyer
(74) *Attorney, Agent, or Firm* — Shumaker & Sieffert, P.A.

(57) ABSTRACT

A method for no-code data driven workflows using external data triggers includes generating a no-code application that includes a trigger condition associated with a first data source and an action response defining an action in response to the trigger condition being satisfied. The method includes receiving a deployment request requesting deployment of the no-code application within an application environment. After receiving the deployment request, the method includes receiving an indication indicating that the trigger condition is satisfied based on trigger data stored at the first data source. The indication is associated with a user of the no-code application. Based on receiving the indication, the method includes executing the action response. After executing the action response, the method includes receiving action response data. The method also includes storing the action response data at a second data source and notifying the user using the action response data.

20 Claims, 14 Drawing Sheets

(56) References Cited

U.S. PATENT DOCUMENTS

| | | | |
|---|---|---|---|
| 11,163,960 B2 | 11/2021 | Saha et al. | |
| 11,226,887 B1 * | 1/2022 | Sharifi Mehr | G06F 11/3612 |
| 11,381,666 B1 | 7/2022 | Stalioraitis et al. | |
| 11,870,741 B2 | 1/2024 | John et al. | |
| 11,922,143 B1 | 3/2024 | Shapiro et al. | |
| 12,079,584 B2 | 9/2024 | Dua et al. | |
| 2003/0115142 A1 | 6/2003 | Brickell et al. | |
| 2005/0102534 A1 | 5/2005 | Wong | |
| 2006/0248406 A1 | 11/2006 | Qing et al. | |
| 2008/0040681 A1 | 2/2008 | Synstelien et al. | |
| 2008/0052348 A1 | 2/2008 | Adler et al. | |
| 2013/0024808 A1 | 1/2013 | Rainisto | |
| 2014/0067702 A1 | 3/2014 | Rathod | |
| 2016/0210361 A1 | 7/2016 | Pistoia et al. | |
| 2016/0321222 A1 | 11/2016 | Greenberg | |
| 2016/0357373 A1 | 12/2016 | Greenberg et al. | |
| 2018/0024814 A1 | 1/2018 | Ouali | |
| 2018/0054464 A1 | 2/2018 | Zhang et al. | |
| 2018/0107461 A1 | 4/2018 | Balasubramanian et al. | |
| 2018/0219921 A1 | 8/2018 | Baer et al. | |
| 2018/0285084 A1 | 10/2018 | Mimlitch, III et al. | |
| 2019/0073197 A1 | 3/2019 | Collins | |
| 2019/0268178 A1 | 8/2019 | Fairweather et al. | |
| 2019/0391823 A1 | 12/2019 | Jouhier | |
| 2019/0394150 A1 | 12/2019 | Denoue et al. | |
| 2020/0153750 A1 | 5/2020 | Petys et al. | |
| 2020/0272114 A1 | 8/2020 | Grabowski et al. | |
| 2020/0301678 A1 * | 9/2020 | Burman | G06F 9/541 |
| 2020/0374244 A1 | 11/2020 | John | |
| 2021/0042094 A1 * | 2/2021 | Burman | G06F 8/34 |
| 2021/0044546 A1 | 2/2021 | Taslimi et al. | |
| 2021/0064349 A1 | 3/2021 | Allgeier et al. | |
| 2021/0064685 A1 | 3/2021 | Weizman et al. | |
| 2021/0089618 A1 | 3/2021 | Jain et al. | |
| 2021/0141616 A1 | 5/2021 | Kane | |
| 2021/0141617 A1 | 5/2021 | Burman et al. | |
| 2021/0337249 A1 | 10/2021 | Jain | |
| 2022/0060435 A1 | 2/2022 | Whitten et al. | |
| 2022/0129257 A1 | 4/2022 | Touati et al. | |
| 2022/0244925 A1 | 8/2022 | Moss et al. | |
| 2022/0366147 A1 | 11/2022 | Ho | |
| 2022/0374209 A1 | 11/2022 | Shek et al. | |
| 2022/0405068 A1 * | 12/2022 | Brown | G06F 8/34 |
| 2023/0047090 A1 * | 2/2023 | Procopio | G06F 8/34 |
| 2023/0107316 A1 | 4/2023 | Ripa et al. | |
| 2023/0110941 A1 | 4/2023 | Makhija et al. | |
| 2023/0125807 A1 | 4/2023 | Ripa et al. | |
| 2023/0136289 A1 * | 5/2023 | Makhija | G06F 8/36 |
| | | | 717/107 |
| 2023/0185544 A1 * | 6/2023 | Procopio | G06F 8/437 |
| | | | 717/109 |
| 2023/0214192 A1 * | 7/2023 | Makhija | G06N 5/01 |
| | | | 717/105 |
| 2023/0214193 A1 * | 7/2023 | Makhija | G06V 30/19113 |
| | | | 717/105 |
| 2023/0224353 A1 * | 7/2023 | Magana | H04L 67/01 |
| | | | 709/203 |
| 2023/0334395 A1 | 10/2023 | Gorroño et al. | |
| 2023/0339102 A1 | 10/2023 | Tapus et al. | |
| 2023/0393832 A1 | 12/2023 | Touati et al. | |
| 2024/0111504 A1 * | 4/2024 | Procopio | G06F 8/38 |
| 2024/0231766 A1 | 7/2024 | Ferreira et al. | |
| 2024/0256784 A1 | 8/2024 | Harris et al. | |
| 2024/0272877 A1 | 8/2024 | Girdhar | |
| 2024/0370234 A1 | 11/2024 | Procopio et al. | |
| 2024/0412157 A1 | 12/2024 | Manzano et al. | |
| 2025/0068396 A1 | 2/2025 | Procopio et al. | |

OTHER PUBLICATIONS

O'Riordan et al., "It's All on the Table: Case Studies on Improved Workflow Management Using Airtable," Routledge, 2023. (Year: 2023).*

Picek, Ruben, "Low-code/No. code Platforms and Modern ERP Systems," IEEE, 2023. (Year: 2023).*

Sufi, Fahim, "Algorithms in Low-Code-No-Code for Research Applications: A Practical Review," MDPI, 2023. (Year: 2023).*

Gwendal et al., "Xatkit: a multimodal low-code chatbot development framework", IEEE Access, vol. 8, Jan. 27, 2020, 15 pp.

"AppSheet—Wikipedia", Wikipedia, 2023, 5 pp., Retrieved from the Internet on Nov. 17, 2025 URL: https://en.wikipedia.org/w/index.php?title=AppSheet&oldid=1163700647.

"Run your app in an iFrame on a web page—AppSheet Help", Google, 2022, 1 pp., Retrieved from the Internet on Nov. 17, 2025 from URL: https://web.archive.org/web/20220528202500/support.google.com/appsheet/answer/10104491.

"Send an email from an automation—AppSheet Help", Google, 2022, 10 pp., Retrieved from the Internet on Nov. 17, 2025 from URL: https://web.archive.org/web/20221104135615/https://support.google.com/appsheet/answer/11447614.

Haile, "Implementing a Low-Code AI-Based Chatbot on Azure combined with Boomi Integration", Bachelor's Thesis, Haaga-Helia University of Applied Sciences, 2022, 72 pp.

Keisala, "Utilizing Large Language Models as No-code Interface in a Software Development Toolkit", Bachelor's Thesis, Jamk University of Applied Sciences, May 2023, 82 pp.

Masili, "No-code development platforms: breaking the boundaries between IT and business experts", vol. 13, No. 1, International Journal of Economic Behavior (IJEB), Apr. 10, 2023, 17 pp.

Matt, "How to Create a Clickable Link to a Specific Record (for an AppSheet app)", MultiTech Visions, Mar. 16, 2023, 7 pp., Retrieved from the Internet on Nov. 24, 2025 from URL: https://www.multitechvisions.com/post/how-to-create-a-clickable-link-to-a-specific-record-for-an-appsheet-app.

Lugovsky, "Low Code vs No Code: Full Analysis 2025", UI Bakery, Inc., Aug. 14, 2023, 15 pp.

Talesra et al., "Low-Code Platform for Application Development", International Journal of Applied Engineering Research, vol. 16, No. 5, May 31, 2021, 6 pp.

Elbatanony, Ahmed, and Giancarlo Succi. "Towards the no-code era: a vision and plan for the future of software development." Proceedings of the 1st ACM SIGPLAN International Workshop on Beyond Code: No Code. 2021. (Year: 2021).

Google for Developers, "Authenticate as a Google Chat app", Oct. 2022, 7 pp.

Google for Developers, "Build an HTTP Google Chat app", Oct. 2022, 6 pp.

International Search Report and Written Opinion of International Application No. PCT/US2025/022811 dated Jul. 7, 2025, 13 pp.

Sahay, Apurvanand, et al. "Supporting the understanding and comparison of low-code development platforms." 2020 46th Euromicro Conference on Software Engineering and Advanced Applications (SEAA). IEEE, 2020. (Year: 2020).

Weber, Irene. "Low-code from frontend to backend: Connecting conversational user interfaces to backend services via a low-code IoT platform." Proceedings of the 3rd Conference on Conversational User Interfaces. 2021. (Year: 2021).

* cited by examiner

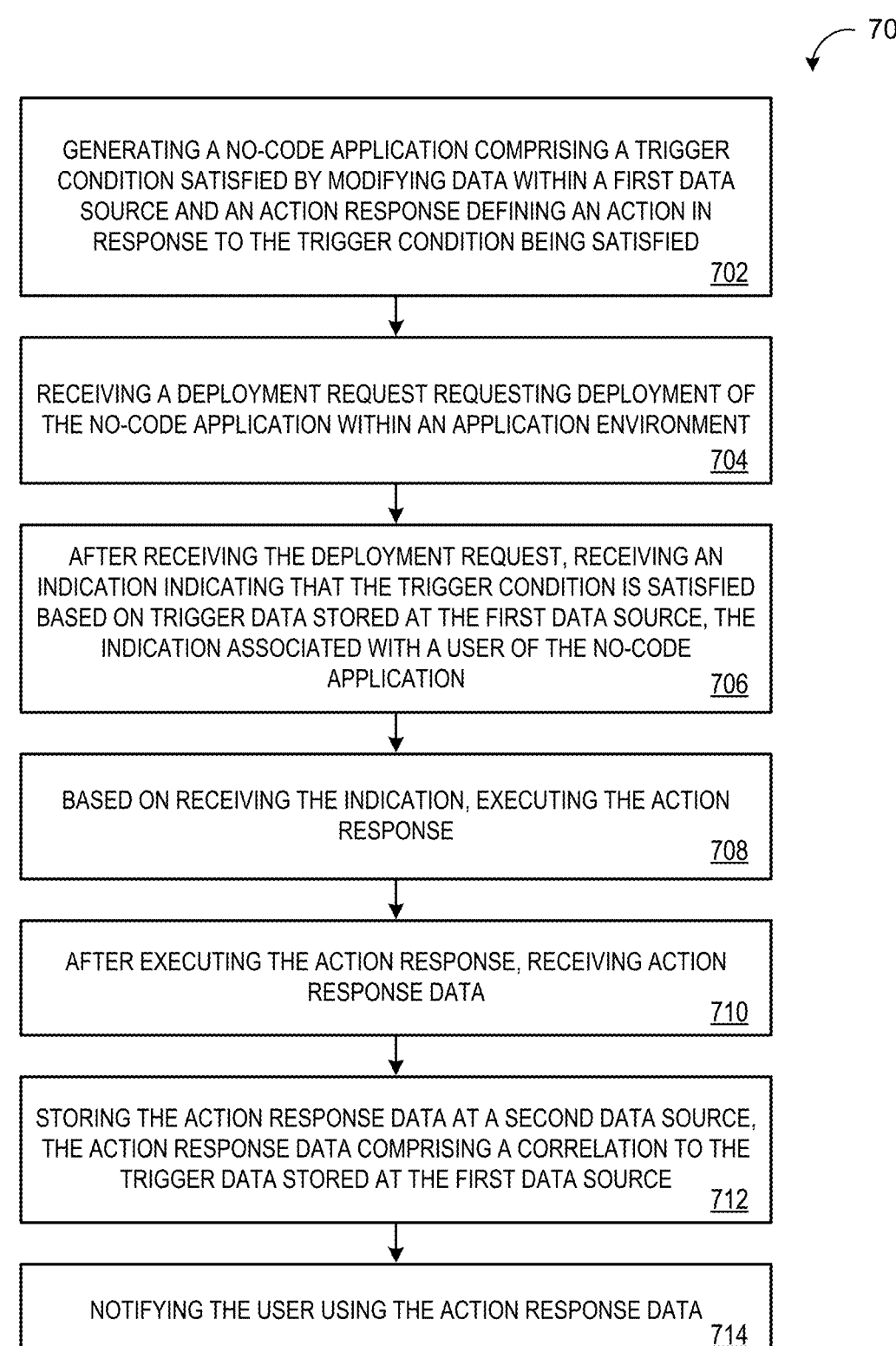

700

GENERATING A NO-CODE APPLICATION COMPRISING A TRIGGER CONDITION SATISFIED BY MODIFYING DATA WITHIN A FIRST DATA SOURCE AND AN ACTION RESPONSE DEFINING AN ACTION IN RESPONSE TO THE TRIGGER CONDITION BEING SATISFIED     702

RECEIVING A DEPLOYMENT REQUEST REQUESTING DEPLOYMENT OF THE NO-CODE APPLICATION WITHIN AN APPLICATION ENVIRONMENT     704

AFTER RECEIVING THE DEPLOYMENT REQUEST, RECEIVING AN INDICATION INDICATING THAT THE TRIGGER CONDITION IS SATISFIED BASED ON TRIGGER DATA STORED AT THE FIRST DATA SOURCE, THE INDICATION ASSOCIATED WITH A USER OF THE NO-CODE APPLICATION     706

BASED ON RECEIVING THE INDICATION, EXECUTING THE ACTION RESPONSE     708

AFTER EXECUTING THE ACTION RESPONSE, RECEIVING ACTION RESPONSE DATA     710

STORING THE ACTION RESPONSE DATA AT A SECOND DATA SOURCE, THE ACTION RESPONSE DATA COMPRISING A CORRELATION TO THE TRIGGER DATA STORED AT THE FIRST DATA SOURCE     712

NOTIFYING THE USER USING THE ACTION RESPONSE DATA     714

FIG. 7

NO-CODE DATA DRIVEN WORKFLOWS USING EXTERNAL DATA TRIGGERS

TECHNICAL FIELD

This disclosure relates to no-code data driven workflows using external data triggers.

BACKGROUND

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code.

SUMMARY

One aspect of the disclosure provides a method for no-code data driven workflows using external data triggers. The computer-implemented method, when executed by data processing hardware, causes the data processing hardware to perform operations. The operations include generating, by an author using a no-code application development environment, a no-code application. The no-code application includes a trigger condition associated with a first data source and an action response defining an action in response to the trigger condition being satisfied. The trigger condition is satisfied by modifying data within the first data source. The operations also include receiving a deployment request requesting deployment of the no-code application within an application environment. After receiving the deployment request, the operations include receiving an indication indicating that the trigger condition is satisfied based on trigger data stored at the first data source. The indication is associated with a user of the no-code application. Based on receiving the indication, the operations include executing the action response. After executing the action response, the operations include receiving action response data. The operations also include storing the action response data at a second data source. The action response data includes a correlation to the trigger data stored at the first data source. The operations also include notifying the user using the action response data.

Implementations of the disclosure may include one or more of the following optional features. In some implementations, the first data source includes a form database that stores form data. In some of these implementations, the trigger condition includes the user submitting the form data that is stored at the first data source.

In some examples, the first data source is read only for the no-code application. The indication may include an identifier identifying data stored at the first data source associated with satisfaction of the trigger condition. Optionally, operations further include synchronizing the second data source with the first data source via one-to-one row mapping. The action response may include generating an approval request and transmitting the approval request to an approver associated with the user. The action response data may then include an approval response from the approver.

In some implementations, notifying the user includes generating a notification within at least one of a chat application or an email. The action response may include generating an approval request, transmitting the approval request to an approver associated with the user, and, in response to receiving approval of the approval request, performing a post-approval action.

response to receiving approval of the approval request, performing a post-approval action.

Another aspect of the disclosure provides a system for no-code data driven workflows using external data triggers. The system includes data processing hardware and memory hardware in communication with the data processing hardware. The memory hardware stores instructions that when executed on the data processing hardware cause the data processing hardware to perform operations. The operations include generating, by an author using a no-code application development environment, a no-code application. The no-code application includes a trigger condition associated with a first data source and an action response defining an action in response to the trigger condition being satisfied. The trigger condition is satisfied by modifying data within the first data source. The operations also include receiving a deployment request requesting deployment of the no-code application within an application environment. After receiving the deployment request, the operations include receiving an indication indicating that the trigger condition is satisfied based on trigger data stored at the first data source. The indication is associated with a user of the no-code application. Based on receiving the indication, the operations include executing the action response. After executing the action response, the operations include receiving action response data. The operations also include storing the action response data at a second data source. The action response data includes a correlation to the trigger data stored at the first data source. The operations also include notifying the user using the action response data.

This aspect may include one or more of the following optional features. In some implementations, the first data source includes a form database that stores form data. In some of these implementations, the trigger condition includes the user submitting the form data that is stored at the first data source.

In some examples, the first data source is read only for the no-code application. The indication may include an identifier identifying data stored at the first data source associated with satisfaction of the trigger condition. Optionally, operations further include synchronizing the second data source with the first data source via one-to-one row mapping. The action response may include generating an approval request and transmitting the approval request to an approver associated with the user. The action response data may then include an approval response from the approver.

In some implementations, notifying the user includes generating a notification within at least one of a chat application or an email. The action response may include generating an approval request, transmitting the approval request to an approver associated with the user, and, in response to receiving approval of the approval request, performing a post-approval action.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a flowchart of an example arrangement of operations for a method for no-code data driven workflows using external data triggers.

Like reference symbols in the various drawings indicate like elements.

DETAILED DESCRIPTION

Figure 1:
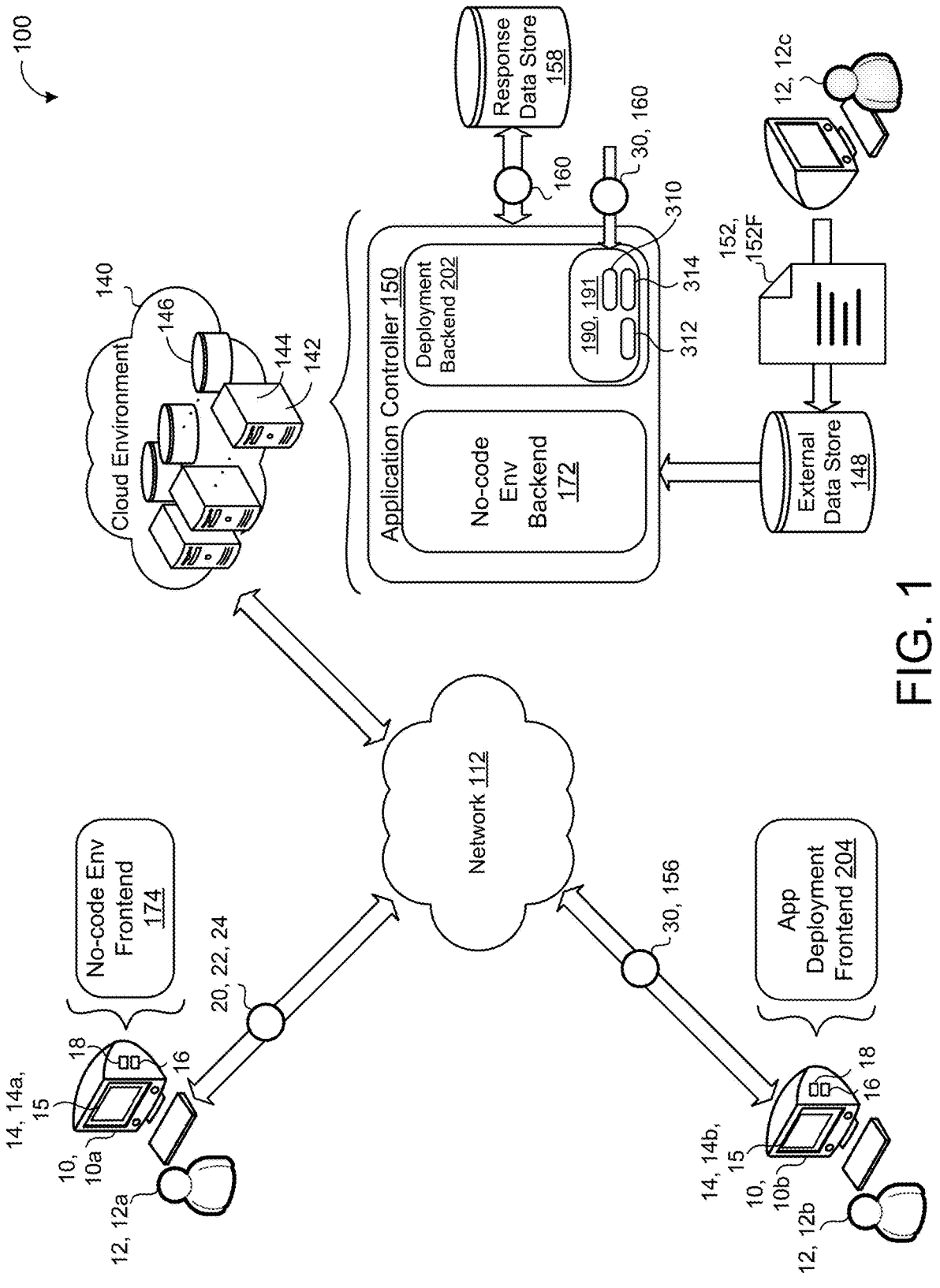
FIG. 1 is a schematic view of an example system for no-code data driven workflows using external data triggers.

It is common for developers and other users to be required to use multiple different software as a service (SaaS) tools and/or multiple different collaboration platforms as the users move through their daily responsibilities. For example, users often must take actions across multiple tools to accomplish a task end-to-end. Because of product boundaries and technical limitations, data often cannot coexist across all of these tools or systems. As such, users are forced to maintain multiple systems for records and to manually link data together via inefficient and risky workarounds (e.g., copy and pasting, screenshots, etc.). This, combined with the frequent context switching (i.e., the switching of attention between different applications or tools), greatly decreases efficiency and productivity.

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code. Combining no-code development platforms with chat applications democratizes the chat application creation process so that anyone, in any role, has the skill needed to set up a chat application.

The complexity and uniqueness of solutions needed to digitize every critical process within an organization remains one of the biggest impediments to digital transformation initiatives across businesses of all sizes, as it is difficult to find solutions to each unique process. While information technology (IT) provides centrally-distributed solutions for key workflows such as customer relationship management (CRM) for sales management or a content management system (CMS) for website content, there are many tasks and processes that are too small, too specialized, and/or too expensive to be within the purview of IT. In these cases, determining a workable solution to the task, request, approval, project, or program at hand falls upon the process owner themselves.

However, process owners and users who need these solutions most often find themselves in a difficult situation. They may recognize that there is a need to simplify their processes, but they lack the resources to do so. Their options for automating their manual flow are either too expensive or too technically complex. This is the advantage of no-code development platforms, by empowering non-developer users to create their own solutions to address the long tail of business processes within an organization. While the exact makeup of those solutions or applications can vary immensely, each is based on the same model: an app creator (often the process owner) selects a tabular data source and gives users various tools (e.g., workflows) to view, update, or otherwise manipulate the data within. Among all applications, those with forms to enable data submission are some of the most common.

Implementations herein include systems and methods that provide application creators the ability to publish and deploy applications (e.g., chat applications) to allow end users the ability to interact with automations using external data sources. For example, the application may integrate with an external form generation/collection application that allows a user to submit a form to trigger automations. Within the application environment, users interact with the applications using, for example, emails, chat cards, and/or dialogs. Based on user-initiated events at the external data source and/or within the application environment, the application executes automations that may interact with multiple data sources (e.g., tables, databases, etc.). The applications may send messages to a user via email or a chat space based on automation triggers.

Referring to FIG. 1, in some implementations, a workflow system 100 includes a remote system 140 in communication with one or more user devices 10 each associated with a respective user 12 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 148 (i.e., a remote storage device) may be overlain on the storage resources 146 to allow scalable use of the storage resources 146 by one or more of the clients (e.g., the user device 10) or the computing resources 144.

The remote system 140 is configured to communicate with the user devices 10 via, for example, the network 112. The user device(s) 10 may correspond to any computing device, such as a desktop workstation, a laptop workstation, or a mobile device (i.e., a smart phone). Each user device 10 includes computing resources 18 (e.g., data processing hardware) and/or storage resources 16 (e.g., memory hardware). The data processing hardware 18 executes a graphical user interface (GUI) 14 for display on a screen 15 in communication with the data processing hardware 18.

The remote system 140 executes an application controller 150. The application controller 150 includes a no-code environment backend 172 (e.g., a no-code application development environment). A first user 12, 12a may communicate with the no-code environment backend 172 via, for example, a first user device 10, 10a and a no-code environment frontend 174 provided by the no-code environment backend 172. For example, the user 12a interacts with the no-code environment frontend 174 using a first GUI 14, 14a displayed on the screen 15. The combination of the no-code environment backend 172 and the no-code environment frontend 174 includes a no-code environment. As discussed in more detail below, the GUI 14a provided by the no-code environment backend 172 may be a web-based GUI 14 (e.g., accessed via a web browser) and provides the user 12a with an interactive, visual workspace to build, execute, and publish no-code applications 190. In other examples, the no-code environment frontend 174 is executed by an application executing on the first user device 10a. The GUI 14a allows the user 12a to drag and drop application routines or subroutines into an editing area where they may be connected to form an application 190. Notably, the user 12 does not require programming skills to generate the application 190. For example, the user 12*a* selects one or more trigger conditions 312 such as a modification to a data repository (e.g., a row being added to a table or a database or a row being updated/modified) and action responses 314 (e.g., sending a notification) that the application 190 executes in response to a trigger condition 312 being satisfied. The application 190 may interact with data stored at the data store 148. For example, the application 190 may monitor for changes within data stored at the data store 148 for the trigger condition 312 and/or modify data stored at the data store 148 for the action response 314. The user 12*a* may select a data source for the application 190. For example, the user 12*a* directs the application controller 150 to one or more data elements (e.g., tables, databases, etc.) stored at the data store 148 when generating the application 190. The application 190 may support many different use cases, such as email automation (e.g., sending customized messages to internal or external users), creating invoices/decks/reports (e.g., generating files at a specified location using templated content), connecting services (e.g., send/return data from external services), and/or scheduling automated data manipulation/logic (e.g., run advanced business logic on data).

The application 190 includes a no-code environment GUI view 310 based on the action response 314. The no-code environment GUI view 310 represents a user interface (UI) view of the application 190 within the no-code environment. That is, the no-code environment GUI view 310 represents the UI the first user 12*a* views when authoring, configuring, and otherwise interacting with the application 190 via the first GUI 14*a*.

In some examples, the application controller 150 receives a trigger interaction indication 20 indicating a graphical user interaction with the GUI 14 by the user 12*a* via the no-code environment frontend 174 (i.e., within the no-code environment) where the user 12*a* sets/defines a trigger condition 312. In response to receiving the trigger interaction indication 20, the application controller 150 establishes the trigger condition 312 for the application 190 generated by the no-code environment 172, 174. The application controller 150 also receives an action interaction indication 22 indicating another graphical user interaction with the GUI 14 by the user 12*a* via the no-code environment frontend 174. In response to receiving the action interaction indication 22, the application controller 150 defines an action response 314 for the application 190 when the trigger condition 312 is satisfied. That is, the action response 314 defines a behavior of the application 190 when the trigger condition 312 is satisfied. For example, when the trigger condition 312 indicates a change to a value within a table stored in the data store 148, the application controller 150 defines an action response 314 for the application 190 that includes generating a notification to a user 12. The user 12*a* may publish or otherwise deploy the application 190 (e.g., via an application deployment backend 202 and/or an application deployment frontend 204) such that the application controller 150 executes the application 190.

In some implementations, during or after the user 12*a* configures the application 190 (e.g., sets one or more trigger conditions 312 and one or more action responses 314), the user 12*a* may publish and/or deploy the application 190 (e.g., as a web application and/or a chat application 191) using the application deployment backend 202 via a deployment request 24. For example, the user 12*a* may configure the application 190 as a chat application 191 based on setting the trigger conditions 312 and/or the action responses 314.

In other examples, the user 12*a*, while selecting deployment or publishing options, selects a chat application option, causing the application controller 150 to deploy the application 190 as a chat application 191 in addition to or alternatively to a traditional or other web-based application (e.g., accessed via a browser).

The application deployment backend 202 may execute the application 190 and/or chat application 191 and expose the application 190 via chat application deployment frontend 204 (i.e., an application environment frontend) to a second user 12, 12*b*. The combination of the application deployment backend 202 and the application deployment frontend 204 together provide an application environment. The second user 12*b* may be the same or different from the first user 12*a*. That is, the application controller 150 may deploy the application 190 for a user 12 that is different from the user 12 that authored the application 190. The second user 12*a*, for example, interacts with the application 190 via a second GUI 14, 14*b* executing on a second user device 10, 10*b*. The second GUI 14*b* allows the second user 12*b* to interact with the application deployment frontend 204 to interact with the application 190. The application deployment frontend 204 may execute on the second user device 10*b*, the first user device 10*a*, another user device (not shown), the remote system 140, or any combination thereof.

Once the application 190 is deployed to the application environment, the application controller 150 may receive an application indication 30 indicating that the trigger condition 312 of the application 190 is satisfied. The application indication 30, in some examples, originates from the second user 12*b* interacting with the application 190 via the application deployment frontend 204. As discussed in more detail below, in other examples, the application indication 30 originates from another source, such as from an interaction with the data store 148 or from interaction with the application 190 from another user. In response to receiving the application indication 30 indicating that the trigger condition 312 is satisfied, the application controller 150 executes the corresponding action response 314.

In some implementations, the application indication 30 is based on trigger data 152 stored at the data source 148. Here, the trigger data 152 is associated with a user 12 of the application 190. In some of these examples, the data store 148 is an external data store 148 that is remote from and/or unaffiliated with the remote system 140 and/or application controller 150. The data store 148 may be read-only for the remote system 140 and/or application controller 150 and/or application 190 (i.e., the application controller 150 is unable to add, delete, or modify data within the data store 148). In some examples, the data store 148 is a form database that stores form data 152, 152F. For example, a user 12, 12*c* (which may be the same as users 12*a-b* or different from users 12*a-b*) generates form data 152 by filling out and submitting an online form. The online form is converted to form data 152F stored at the data store 148. The user 12*c* may generate the form data 152F via interactions with a form service (i.e., by submitting one or more forms) that is associated with the remote system or not associated with the remote system 140. The application indication 30 may include an identifier that identifies particular data stored at the data store 148 that is associated with satisfaction of the trigger condition. For example, the identifier identifies one or more rows of data at a table of the data store 148 that include the form data 152F submitted by the user 12*c*.

While examples herein focus on the external data store 148 as a repository for form data 152F (i.e., from users 12 submitting forms), the application controller 150 may interface with any number of data stores. For example, the application controller 150 may interface with an internal human resources system, an inventory management system, or any system that allows the application controller 150 read access to the data source (e.g., rows and columns of a table).

Based on receiving the application indication 30 (e.g., the user 12 submitting a form as form data 152F to the data source 148), the application controller 150 executes the corresponding action response 314. In some examples, after executing the action response 314, the application controller 150 receives action response data 160. The action response data 160 includes any data that is generated in response to the action response 314. For example, when the form submitted by the user 12C includes an approval request (e.g., a request to approve travel), the action response 314 includes transmitting the approval request to a user 12 authorized to approve the approval request (i.e., an approver associated with the user 12). In this example, the action response data 160 includes an approval response from the approver, such as whether the approval request was approved or denied (and any other relevant data, such as who approved or denied the request, the time at which the request was approved or denied, any notes or comments from the approver, etc.).

In some implementations, the action response 314 includes generating an approval request and transmitting the approval request to an approver associated with the user 12 who submitted the approval request. In some of these implementations, the action response 314 includes, in response to receiving approval of the approval request (i.e., from the approver), performing a post-approval action. The post-approval action may include a user notification (e.g., an email or chat notification) and/or other automated non-notification actions, such as calling and executing a script defined by the author of the application 190, making a remote procedure call, or execute any other functionality in another system via an application programming interface (API).

In some examples, the application controller 150 stores the action response data 160 at a response data store 158 along with a correlation to the trigger data 152 stored at the external data store 148. That is, in some scenarios, the data store 148 is read-only for the application controller 150 and/or the application 190, so the application controller 150 instead stores the action response data 160 at the response data store 158 along with the correlation to the trigger data 152 (e.g., an identifier that identifies a row or other location of the trigger data 152 at the data store 148). In this way, the application controller 150 can store data related to or associated with the trigger data 152 without having write access to the external data store 148. The application controller 150 may store any metadata and/or user-specified fields associated with the trigger condition 312 or the user 12 with the action response data 160. In other examples, the external data store 148 is modifiable by the application controller 150 and the action response data 158 is instead stored at the external data store 148.

The application controller 150 may keep the response data store 158 synchronized with the external data store 148 using row-by-row mapping or one-to-one row mapping. The synchronization may be maintained via periodic reads of the external data store 148 or based on triggering events (e.g., data submitted to the external data store 148, a user interaction with the application 190, etc.).

The application controller 150 may generate and/or configure the response data store 158 for the application 190 (e.g., during creation or deployment of the application 190).

In some examples, only the action response data for the application 190 is stored at the response data store 158.

The application controller 150 may notify a number of users 12 of the action response data 160. For example the application controller 150 notifies a user 12b of the application 190 or the user 12c who submitted the form (which may be the same or different users 12). A notification 156 from the application controller 150 may take any number of forms. For example, the notification 156 includes an email to the user 12 or a chat notification via a chat application (e.g., when the application 190 is a chat application 191 or is associated with a chat application 191). The notification 156 may include some or all of the action response data 160. For example, the notification 156 indicates approval or rejection of an approval request (submitted via the form data 152F).

In some examples, the notification may be generated or routed based on business logic central to a business. For example, the application controller 150 may determine the appropriate approver to route an approval request to by querying an interface to an on-premises human resources system. For instance, the application controller 150 may query the human resources system with an identity of the submitter of the approval request and the human resources system may return an identity of a supervisor of the submitter than the approval request should be routed to. By relying on such business logic, the author of the no-code application 190 does not need to hard code or predefine the routes of approval requests (or other action responses) and instead rely on intelligent logic to determine the route in real-time. Optionally, the notification route includes a "group" construct that includes one or more people to notify (e.g., an email list) or references a chat space or channel. The chat space may be associated with one or more members who may be notified of the approval request and authorized to respond to the approval request.

Figure 2:
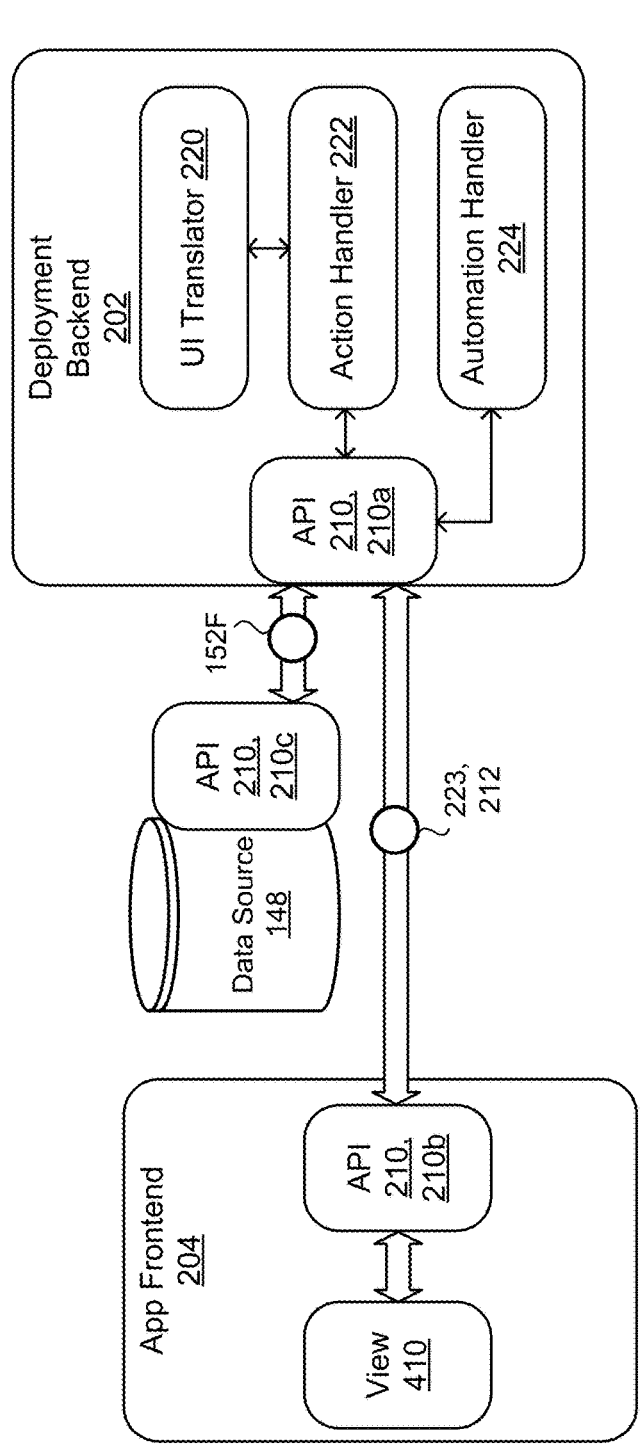
FIG. 2 is a schematic view of exemplary components of the system of FIG. 1.

Referring now to FIG. 2, a schematic view 200 includes exemplary components of the application deployment backend 202. Here, the application deployment backend 202 includes a UI translator 220 that may translate the no-code environment GUI view 310 into a chat application GUI view 410. For example, the chat application GUI view 410 may include a "chat card" or dialog (e.g., a UI JavaScript Object Notation (JSON) object). The chat card represents a graphic rendered directly within the chat application environment that provides visual information to the user 12. The chat card may include an "inline card" (FIGS. 4 and 5B) that is rendered within a chat box UI (e.g., a UI widget embedded inline with chat text). Alternatively, the chat card may include a "popup" (FIG. 5A) that may be rendered outside of the chat box UI. The popup chat card, in some implementations, is moveable and/or resizable by the user. In some examples, the chat card is interactive and allows the user to select or otherwise interact with the chat card to retrieve additional information or provide information to the chat application 191.

The chat application GUI view 410 may be dependent or based upon the action response 314. For example, the action response 314 may include generating an approval request, and subsequently the chat application GUI view 410 may provide a user 12 with the ability to approve or reject the approval request. In this example, the chat application 191 renders a chat card detailing the approval request and requesting the user 12 to approve or reject the approval request. The UI translator 220 may provide/translate the chat application GUI view 410 based on actions by a user 12 (e.g., by interacting with the chat application 191 via the chat application deployment frontend 204) or based on one or more trigger conditions 312 satisfying an action response 314. For example, a row is added to a table stored in the data store 148, triggering the chat application 191 to send a notification to a user 12 via the chat application environment. As another example, an element of a row (e.g., a column or field) is changed (such as by changing an approval status in a column in an approval entry row of a pending approvals table), triggering the chat application 191 to send a notification to a user 12 (e.g., indicating that a change was approved) via the chat application environment.

In this example, the chat application deployment backend 202 also includes an action handler 222 that is responsible for all user interactions with the chat application 191. The action handler 222 may interact with the UI translator 220 to instruct the UI translator 220 to construct the chat application GUI view 410 based on, for example, chat actions 223. Chat actions 223 include any interactions the user 12 may have with the chat application 191, such as navigation actions, data exchange actions, external communications, or composite actions. That is, chat actions 223 define how the user 12 interacts with the chat application 191. The chat actions 223 may include any interaction by the user 12 with the chat application 191 that is not explicitly defined by the action response 314 (i.e., actions implicitly included with the chat application 191 such as clicking an action in a chat card).

The action handler 222 maintains a current application state for the chat application 191. That is, the action handler 222 tracks and stores all of the information generated by user interactions with the chat application 191 that is needed to move that chat application 191 to subsequent states. The action handler 222 may also direct the UI translator 220 to generate specific chat application GUI views 410 (e.g., in response to navigation commands from the user 12). Additionally or alternatively, the action handler 222 executes data change actions, such as by updating data underlying views and instructing the UI translator 220 to generate chat application GUI views 410 reflecting the updated data.

In some examples, the chat application deployment backend 202 includes an automation handler 224. The automation handler 224 processes or executes "automations" (e.g., action responses 314) when the trigger condition 312 is satisfied by a user 12 interacting with the chat application 191 within the chat application environment frontend 204. For example, the user 12 sends a specific emoji configured by the chat application author (i.e., the first user 12a), the automation handler 224 may execute the appropriate action response 314 (e.g., modifying data in a data repository, generate an approval request for another user 12, displaying a chat card, etc.).

In some implementations, the chat application deployment backend 202 includes a backend application programming interface (API) 210, 210a that receives all incoming chat messages 212 from the chat application environment (i.e., chat messages entered by users 12 via the chat application deployment frontend 204). The backend API 210a may include a lightweight processor for processing incoming chat messages 212 and chat actions 223 with minimal logic to forward requests to other modules of the chat application deployment backend 202 (e.g., the action handler 222, the automation handler 224, etc.) based on contents of the chat messages 212 and/or chat actions 223. The backend API 210a may include authorization and/or authentication procedures for ensuring users 12 are authorized for a particular action or response. For example, the backend API 210a verifies that a user 12 has authorization to access the chat application 191 (e.g., via user credentials, tokens, access lists, etc.) prior to forwarding a chat action 223 from the user 12 to the action handler 222 and/or translating the no-code environment GUI view 310.

The backend API 210a may communicate with the application frontend 204 via the chat application 191 and a frontend API 210, 210b. The frontend API 210b may receive and process chat application GUI views 410 from the chat application deployment backend 202 and provide the chat messages 212 and/or chat actions 223 to the chat application deployment backend 202. The backend API 210a may also communicate with the external data source 148 via an external API 210, 210c associated with the external data source 148. For example, the backend API 210a may retrieve the form data 152F from the external data source 148 via the API 210c.

Figure 3A:
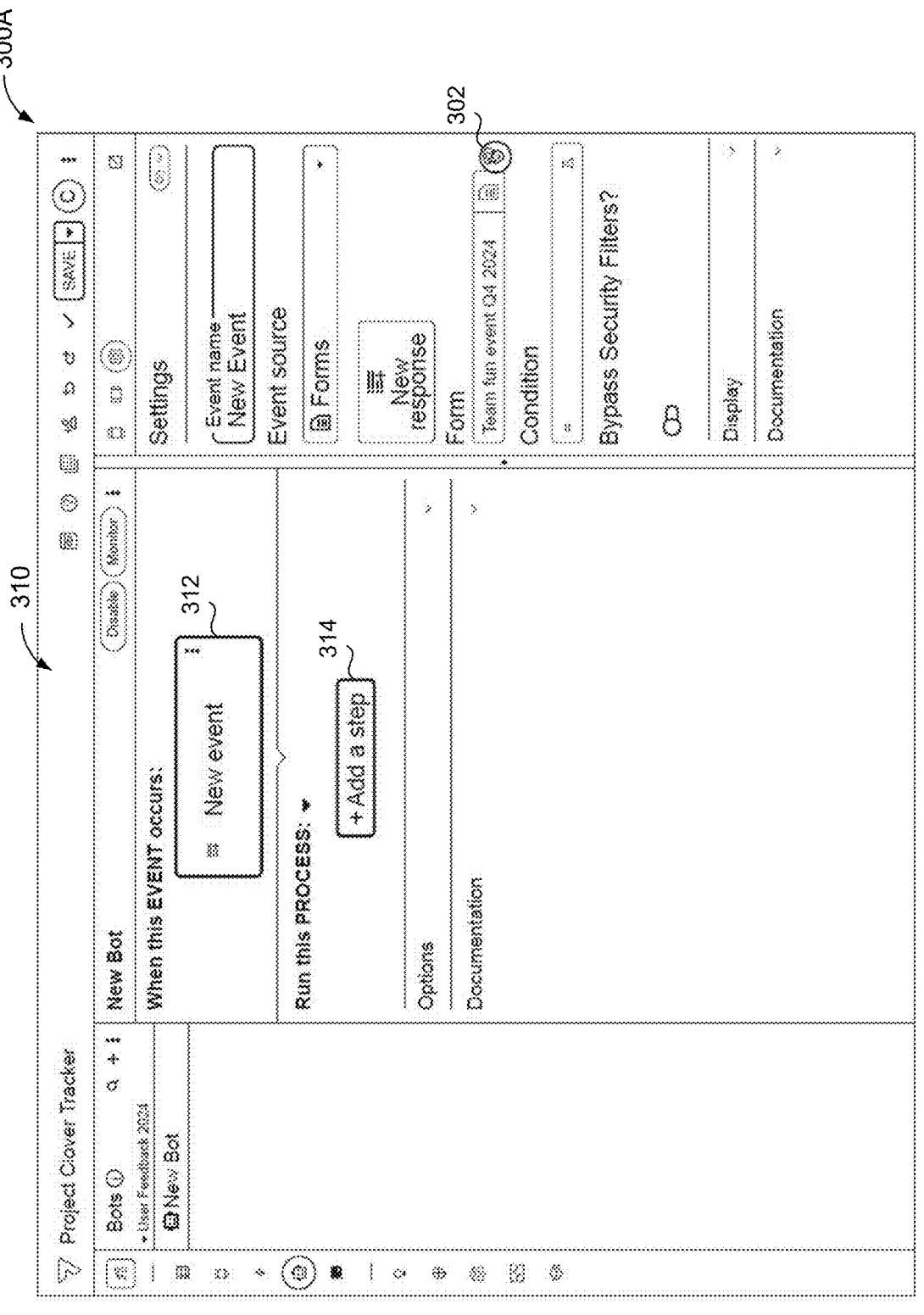
FIGS. 3A and 3B are schematic views of exemplary graphical user interfaces for a no-code application environment.
Figure 3B:
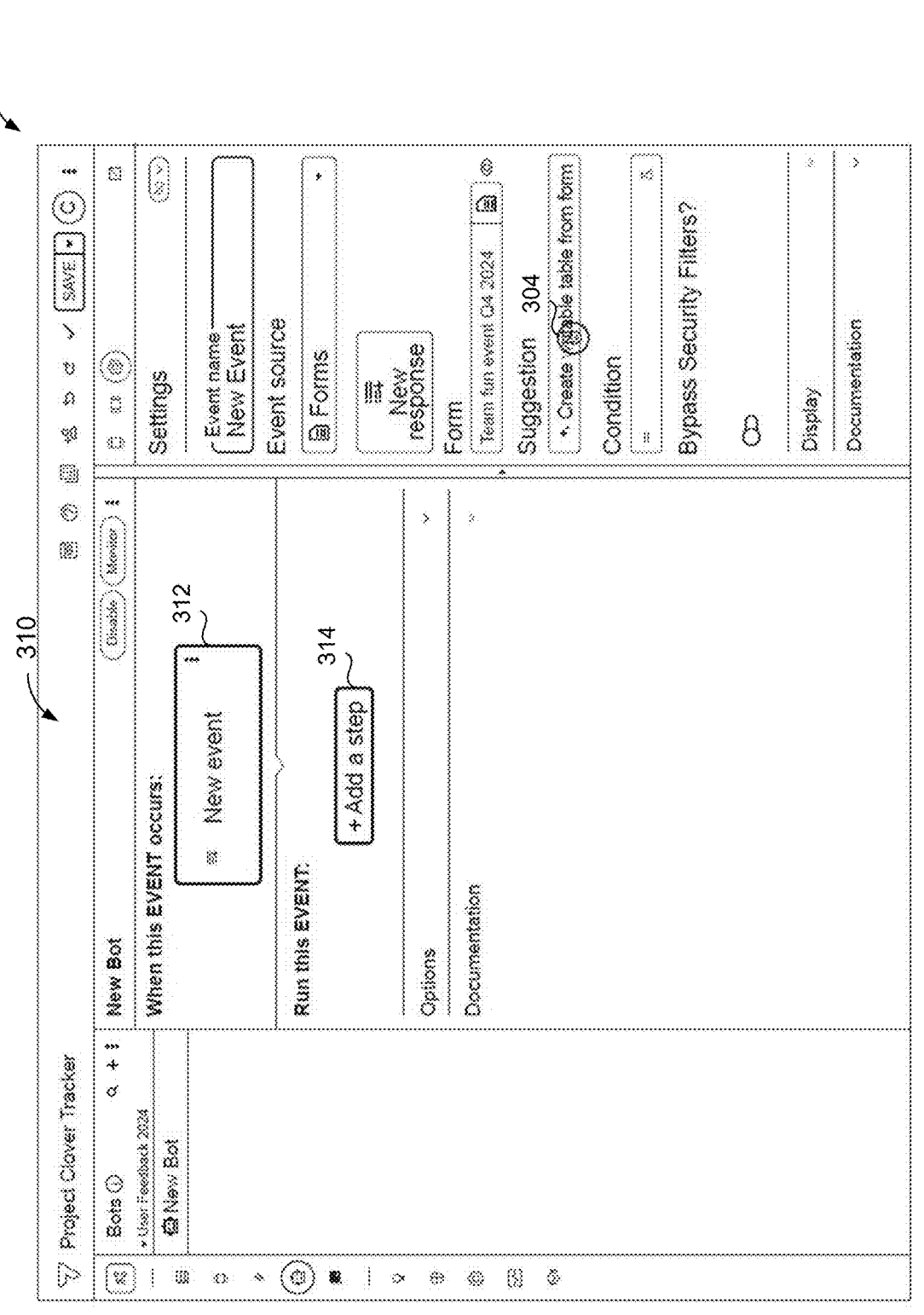

Referring now to FIG. 3A, an exemplary GUI view 300A (e.g., displayed on GUI 14a for viewing by the user 12a) displays an exemplary no-code environment GUI view 310. The no-code environment GUI view 310 allows the user 12 to configure trigger conditions 312 and action responses 314. Here, a user input 302 offers a user 12 a suggestion for configuring the application 190 with an external data store 148 (e.g., a form external data store). At FIG. 3B, an exemplary GUI view 300B includes a user input 304 within the no-code environment GUI view 310 to generate the response data store 158 to store the action response data 160 that is mapped or correlated with the external data store 148.

Figure 4A:
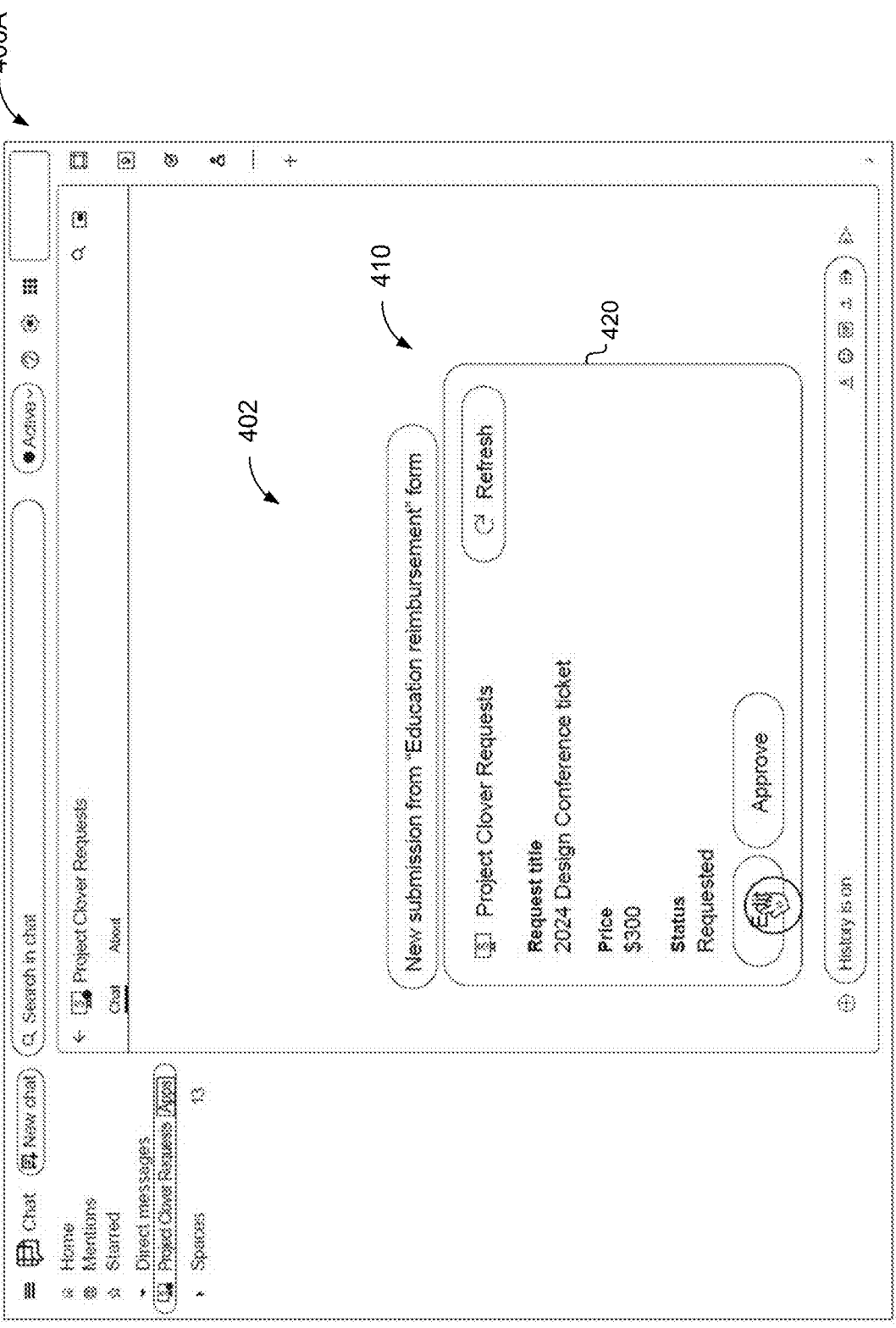
FIGS. 4A-4C are schematic views of exemplary graphical user interfaces for a chat application.

Referring now to FIG. 4A, a schematic view 400A includes an exemplary GUI 14b displayed on the screen 15 of the second user device 10b when the user 12b is interacting with the application environment frontend 204. In some examples, the chat applications 191 may be represented in the GUI 14b as an individual that the user 12b may interact and message with. In this example, the user 12b receives direct messages from a "Project Clover Requests" chat application 191. The Project Clover Requests is a chat application 191 authored and published by a user 12 and deployed to the application environment frontend 204 by, for example, the user 12b, the author of the chat application 191, or an administrator, etc. In this example, the user 12b has selected the Project Clover Requests and a history of communications with the Project Clover Requests is visible in a chat pane 402. Here, the only communication at this point is a message from the Project Clover Requests (i.e., the chat application 191) with a chat application GUI view 410.

In this example, the chat application GUI view 410 takes the form of an interactive chat card 420. The chat card 420 provides the user 12b with three separate interactions (i.e., a "Refresh" action, an "Edit" action, and an "Approve" action). The chat card 420 may be rendered directly into the chat pane 402 in response to the user 12b interacting with the chat application 191. In this instance, chat card 420 allows the user 12b, using a cursor 430, to select the "Approve" option to immediately approve the request without further input or the "Edit" action to provide notes or to take other actions. In this example, the user 12 selects the "Edit" action. The chat card 420 may allow other forms of user interaction (e.g., touch, voice commands, etc.).

Figure 4B:
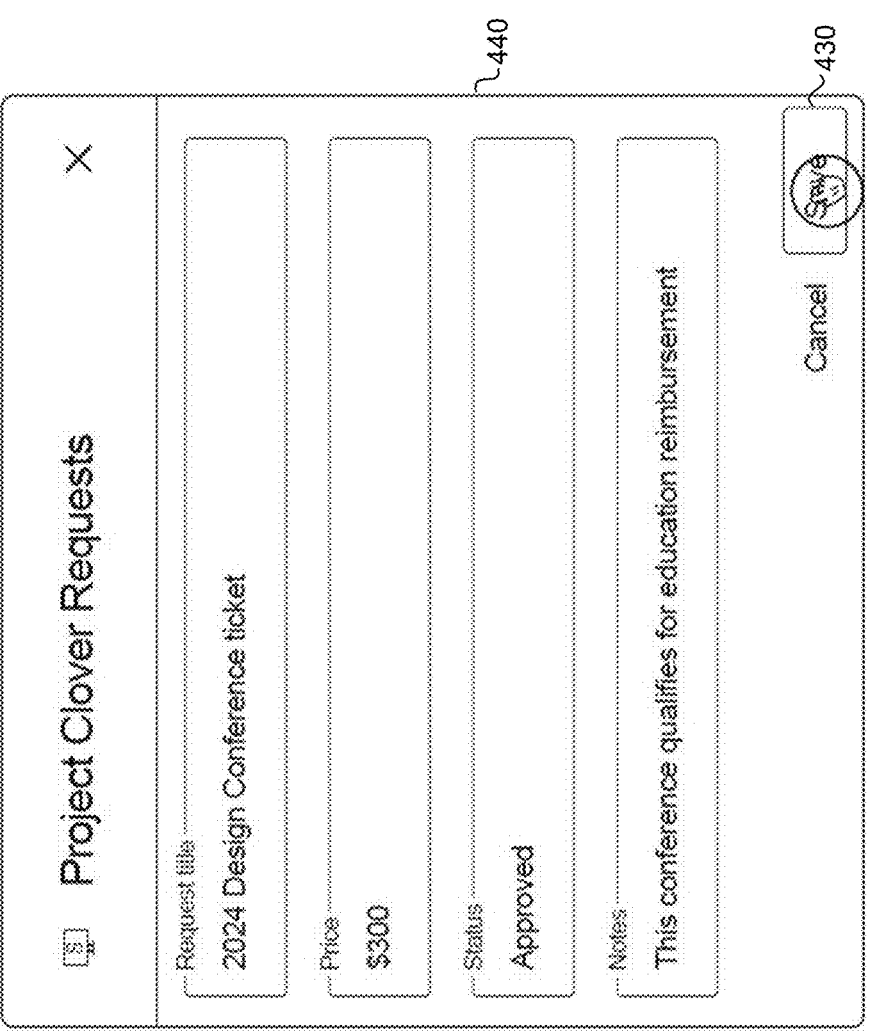

Referring now to FIG. 4B, a schematic view 400B continues the example of FIG. 4A where the chat application GUI view 410, in response to the user 12b selecting the "Edit" action (FIG. 4A), updates to include an edit pop-up window 440. While not shown here, the edit pop-up window 400 may overlay the chat pane 402 (FIG. 4A). The edit pop-up window 440, in this example, allows the user 12b to edit fields that include a "Request Title," a "Price," a "Status," and a "Notes." Each field includes a corresponding text field allowing the user 12*b* to input data. While in this example, the user 12*b* enters the data via text (e.g., using a keyboard), any forms of data input may be supported (e.g., voice commands). Here, the user 12*b* selects a "Save" input 430, thus submitting the updates to the chat application 191. Submission of the data (i.e., approval of the request in this case) may cause any number of action responses 314 to be performed. Here, the approval may be added to the response data store 158 and notifications may be sent to one or more users 12 (e.g., the user associated with the original request). The approval may trigger other trigger conditions 312 of the same chat application 191 or other applications 190 (which may or may not include chat applications 191).

Figure 4C:
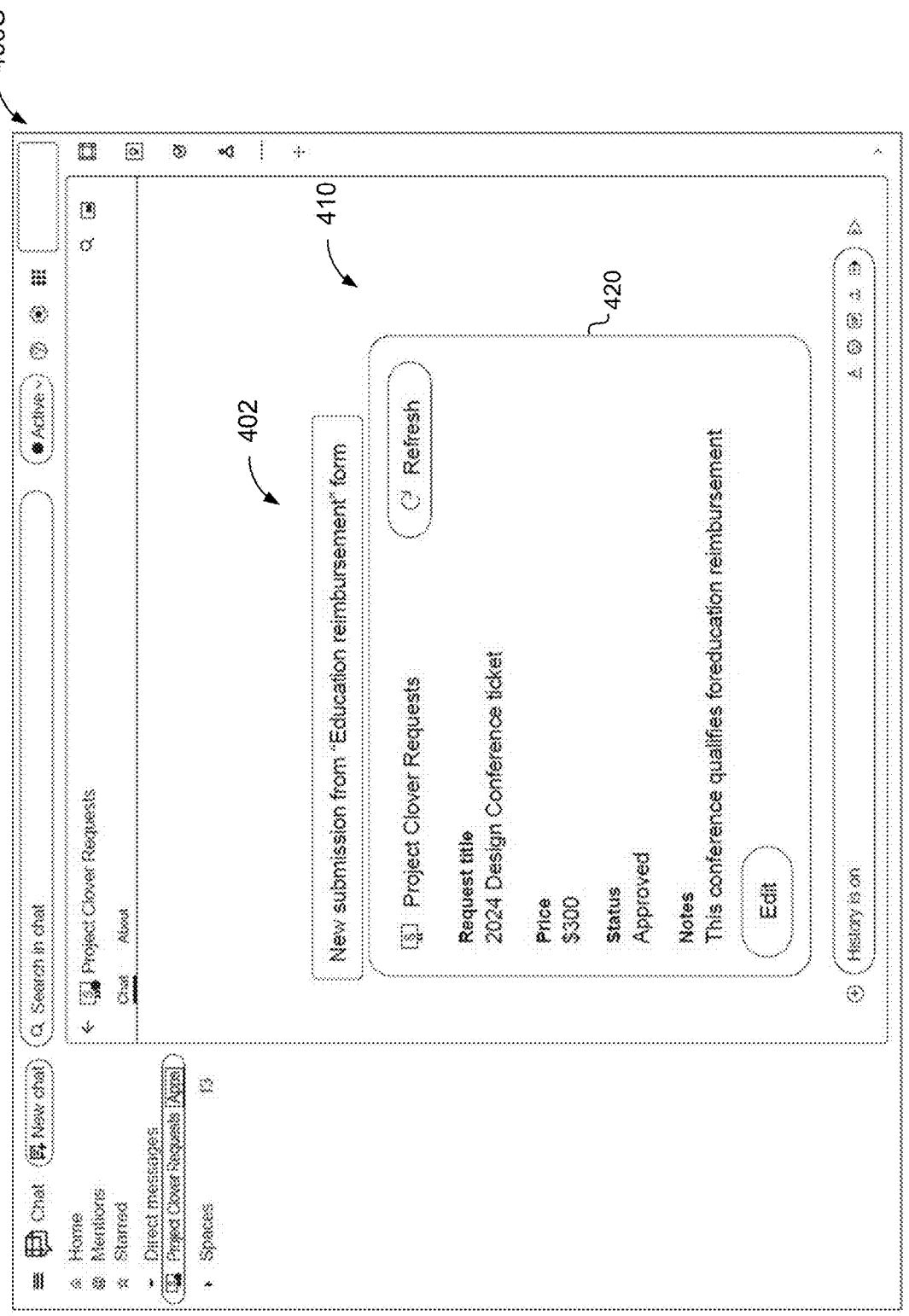

Referring now to FIG. 4C, a schematic view 400*c* continues the example of FIGS. 4A and 4B, where the chat application GUI view 410, in response to the user 12*b* selecting the "Save" action (FIG. 4B), renders the updated interactive chat card 420. Here, the "Status" and "Notes" fields have been updated to reflect the information the user 12 provided in the example of FIG. 4B. The interactive chat card 420 may update based on changes to the underlying data at the response data store 158. That is, the user edits of FIG. 4B caused data to be modified or added to the response data store 158 and the interactive chat card 420 updates to reflect the modified and/or new data of the response data store 158. The interactive chat card 420 may update automatically (e.g., periodically or in response to the user 12 selecting the "Save" action) and/or in response to the user 12 selecting the "Refresh" action.

Figure 5:
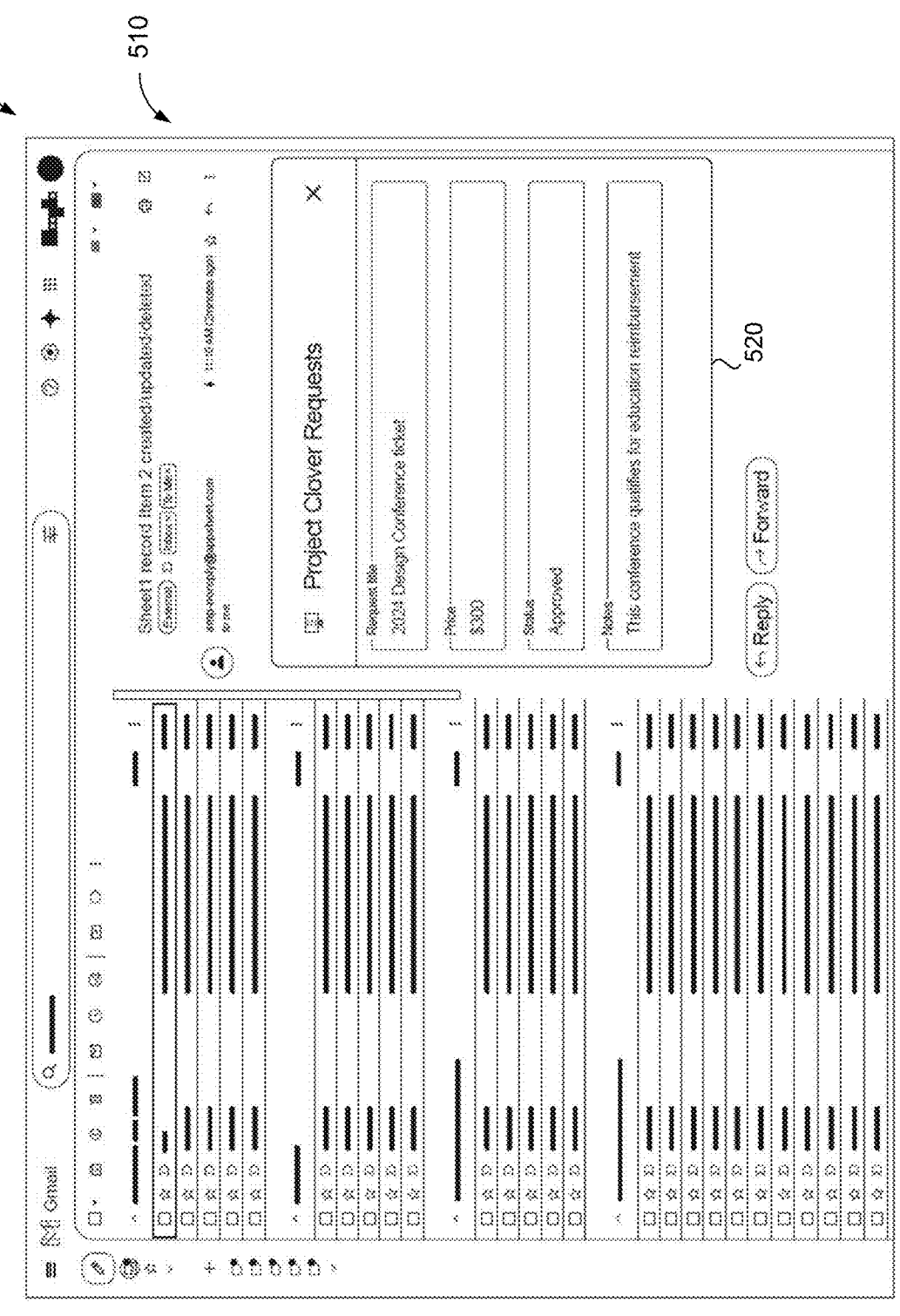
FIG. 5 is a schematic view of an exemplary graphical user interface for an email notification.

Referring now to FIG. 5, a schematic view 500 includes an exemplary response to the approval request of FIGS. 4A-4C being approved (or any other action that causes data at the response data store 158 to be modified and/or added, thus triggering an action response 314). Here, the response includes an email 510 automatically composed and sent to a user 12 specified by the application 190 (e.g., the submitter of the approval request). In this example, the email 510 includes an interactive card 520 rendered directly within the email 510. The fields within the interactive card 520 may be dynamically populated via reads to the response data store 158 and/or external data store 158.

Referring now to FIGS. 6A-6D, schematic views 600A-D illustrate an exemplary project "wizard" set up flow for approvals using templates and/or suggestions. At FIG. 6A, the schematic view 600A displays an application form configuration view where a user input 602 provides a user 12 a suggestion for configuring the application 190 for an approval flow using a form. In response to selecting the suggestion user input 602, the schematic view 600B (FIG. 6B) includes an approval configuration pop-up 604. Here, the no-code environment allows the user 12 to create or configure the response data store 158 (i.e., "Team fun event Q4 2024: Approval Tracker" in this example) along with a number of configurable fields 608 for configuring the approval request. For example, the user may specify labels and data types to dictate the manner and type of information provided to users 12 when filling out the approval request. That is, the user 12 may configure how the approval request is rendered by the app deployment frontend 204 (e.g., in an email or a chat notification). Here, the user 12 has configured the response data store 158 to store a "Status" field with a dropdown type (i.e., a dropdown menu where a user 12 selects an option from a plurality of options) and a "Notes" field with a text type. The selection of these configuration options define the labels of the approval requests, such as the "Request title," "Price," and "Status" fields of the approval request shown in the chat application GUI view 410 (FIG. 4A). Other configuration options may be provided, such as notification configuration options. Here, the user 12 may select an option for automatically generating an email notification when an approval is submitted. In this example, the user 12 selects an edit option 606 for editing configuration of the response data store 158.

Figure 6A:
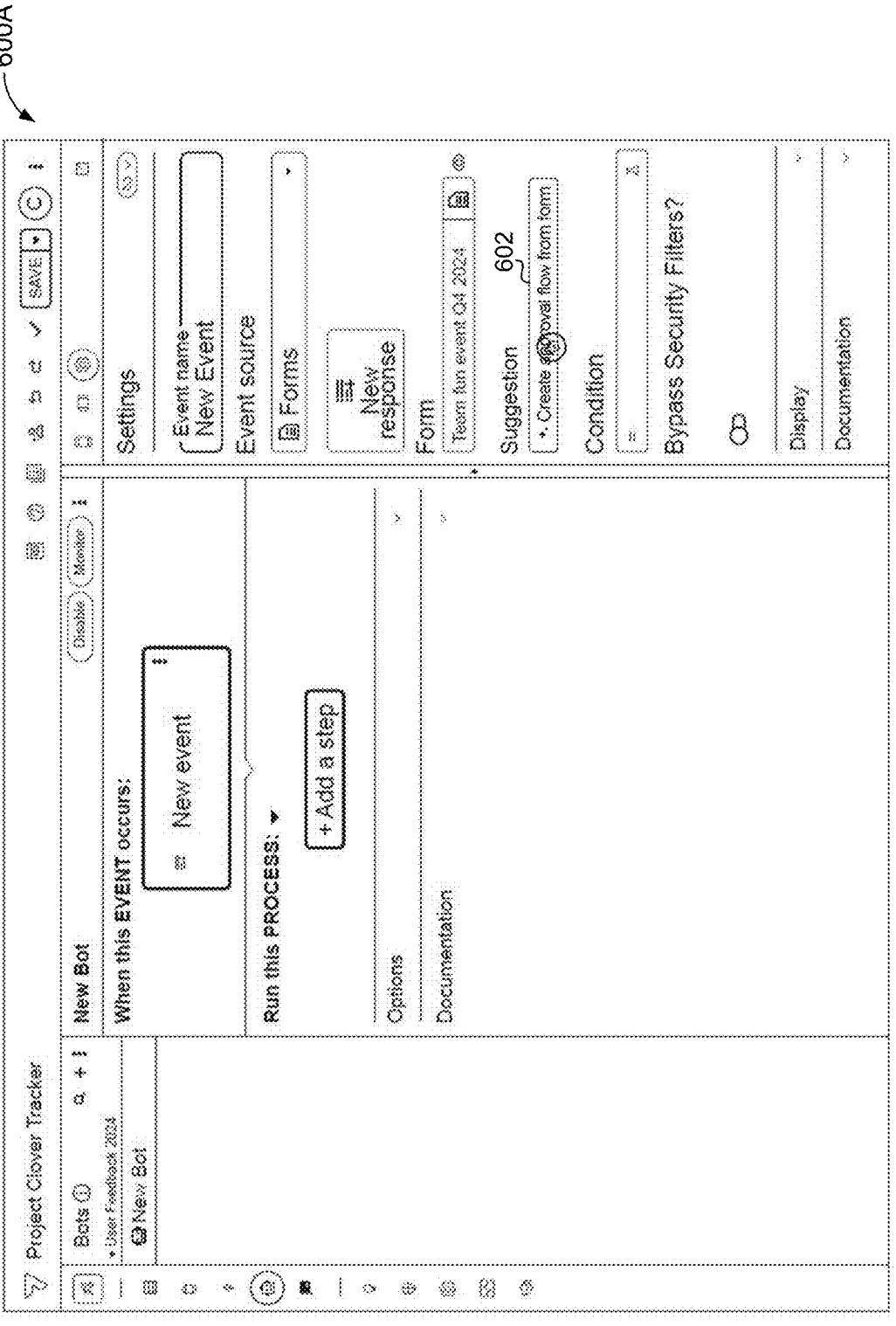
FIGS. 6A-6D are schematic views of exemplary graphical user interfaces for configuring an approval workflow.
Figure 6B:
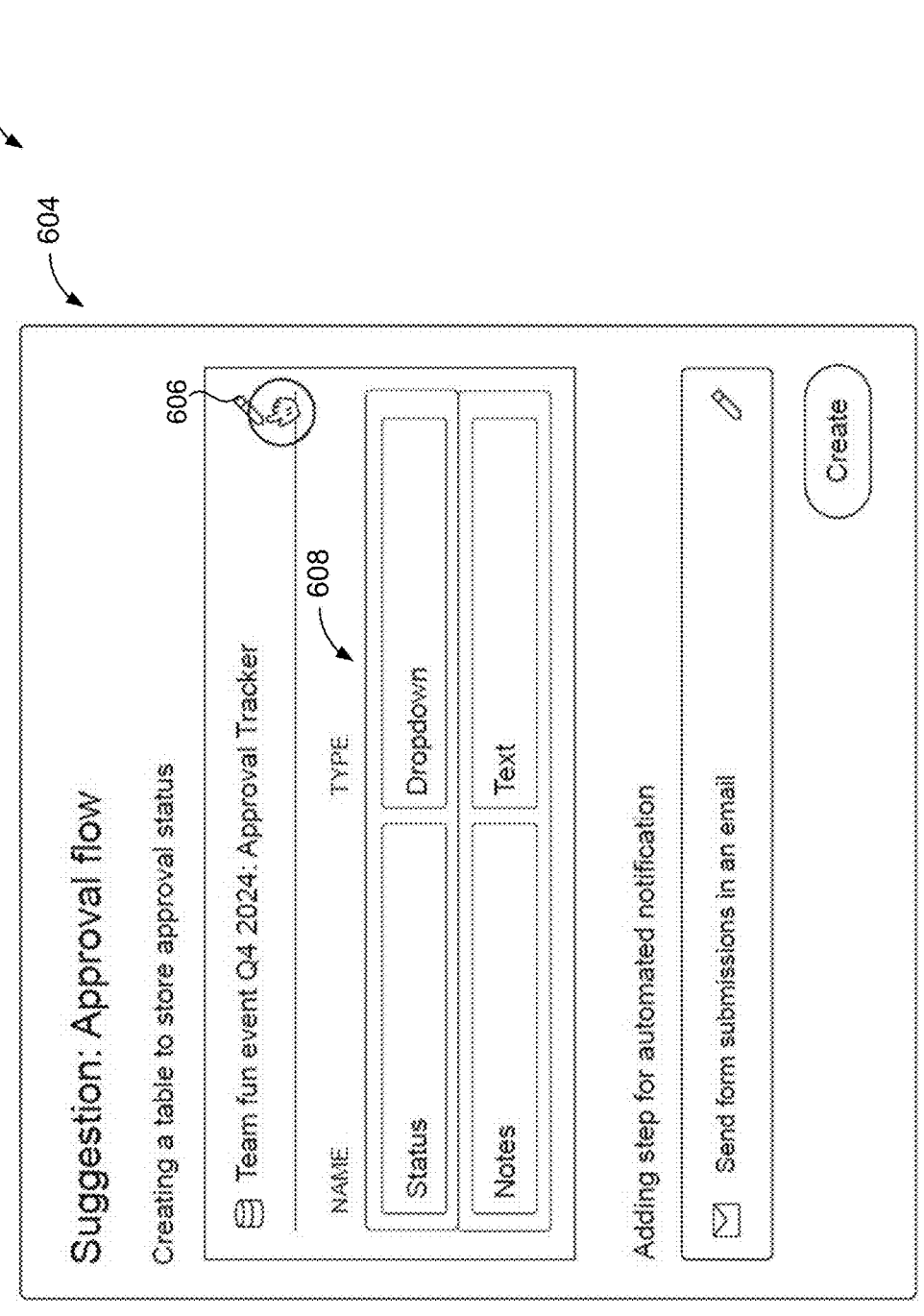
Figure 6C:
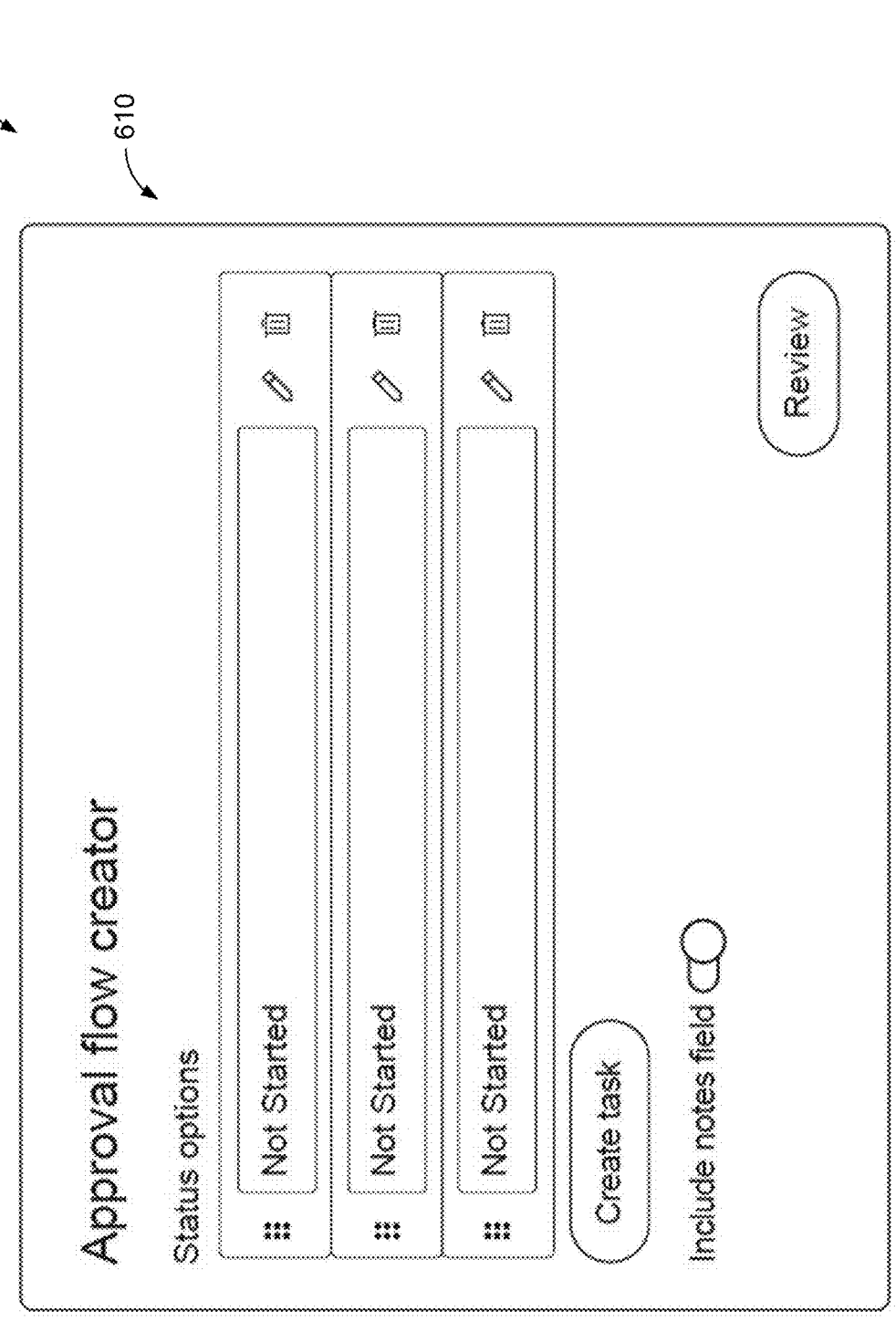
Figure 6D:
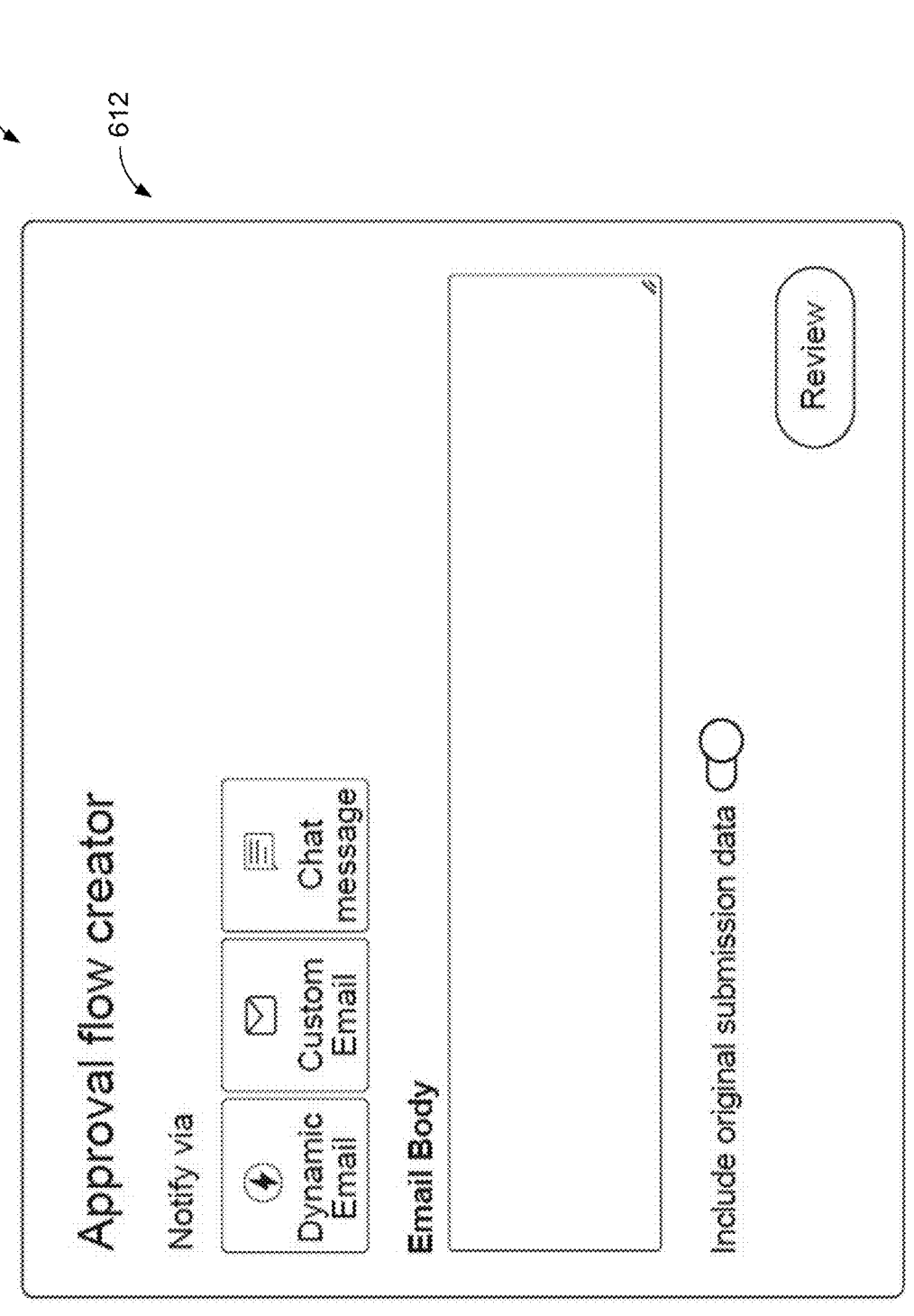

The schematic view 600C of FIG. 6C continues the example of FIG. 6B with an approval flow creator view 610 that provides the user 12 options for configuring tasks. For example, the user 12 may specify how to route approvals (i.e., who should receive the approvals). The schematic view 600D of FIG. 6D includes a notification configuration view 612 allowing the user to configure notification options, such as by selecting a dynamic email, a custom email, and/or a chat message, along with configuration options specific to each type.

Thus, implementations herein include an application controller that integrates a no-code application development environment with external data sources, such as form submission tools. This allows the application controller to address a broader set of use cases for a broader range of users than conventional techniques. The application controller allows for increased productivity by allowing users to create more powerful workflows while simultaneously reducing the complexity of tool management. The application controller provides an improved user experience as users may create and manage workflows easily.

FIG. 7 is a flowchart of an exemplary arrangement of operations for a method 700 for no-code data driven workflows using external data triggers. The method 700, when executed by data processing hardware 144, causes the data processing hardware 144 to perform operations. The method 700, at operation 702, includes generating, by an author 12 using a no-code application development environment 172, 174, a no-code application 190 that includes a trigger condition 312 associated with a first data source 148 and an action response 314 defining an action in response to the trigger condition 312 being satisfied. The trigger condition 312 is satisfied by modifying data within the first data source 148.

At operation 704, the method 700 includes receiving a deployment request 24 requesting deployment of the no-code application 190 within an application environment 172, 174. At operation 706, the method 700 includes, after receiving the deployment request 24, receiving an indication 30 indicating that the trigger condition 312 is satisfied based on trigger data 152 stored at the first data source 148. The indication 30 is associated with a user 12 of the no-code application 190. Based on receiving the indication 30, the method 700, at operation 708, includes executing the action response 314. After executing the action response 314, the method 700, at operation 710, includes receiving action response data 160. The method 700, at operation 712, includes storing the action response data 160 at a second data source 158. The action response data 160 includes a correlation to the trigger data 152 stored at the first data source 148. At operation 714, the method 700 includes notifying the user 12 using the action response data 160.

Figure 8:
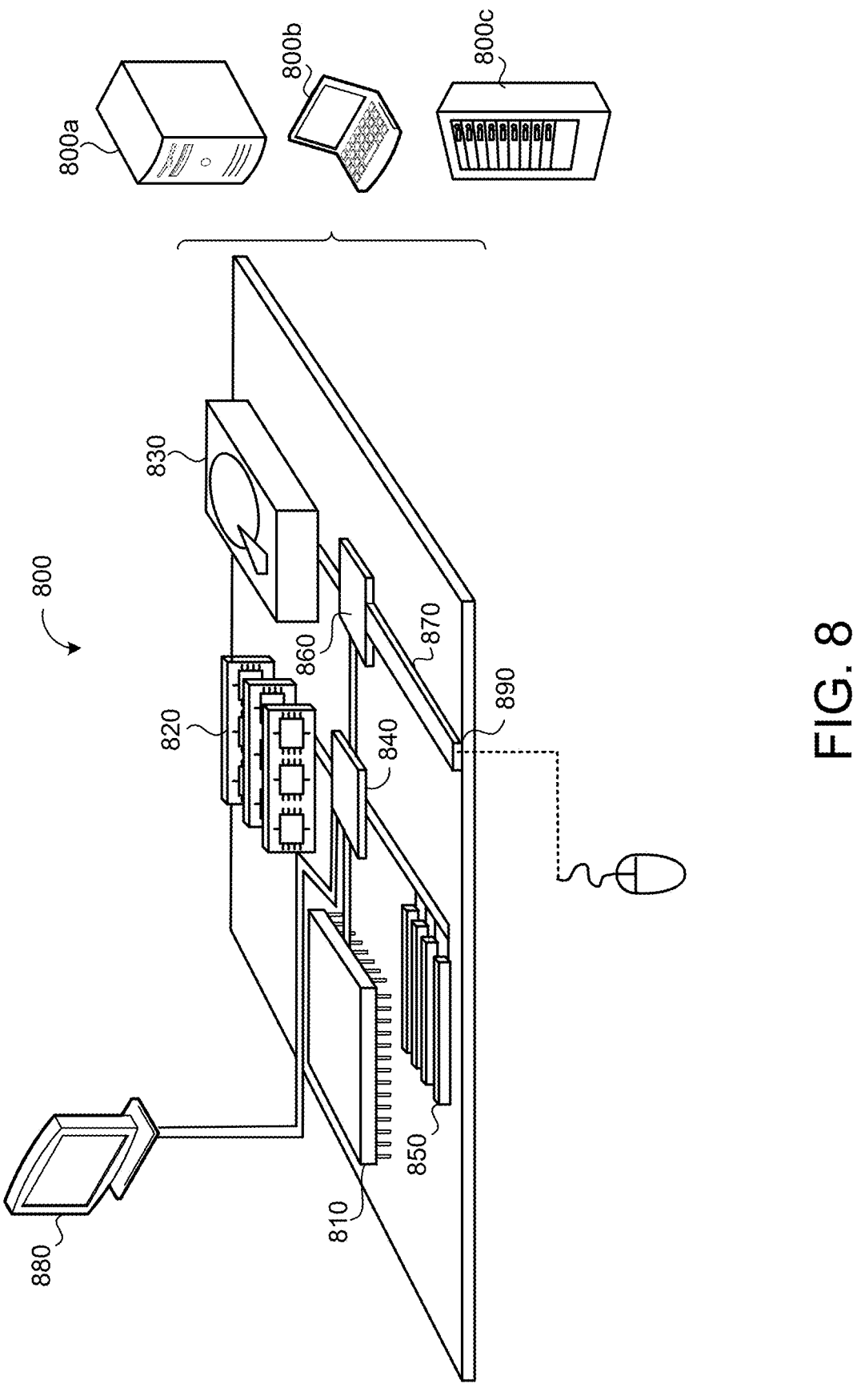
FIG. 8 is a schematic view of an example computing device that may be used to implement the systems and methods described herein.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/ controller 840 connecting to the memory 820 and high-speed expansion ports 850, and a low speed interface/ controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   generating, by an author using a no-code application development environment, a no-code application, the no-code application comprising:
      a trigger condition associated with a first data source, the trigger condition satisfied by modifying data within the first data source; and
      an action response defining an action in response to the trigger condition being satisfied;
   receiving a deployment request requesting deployment of the no-code application within an application environment;
   after receiving the deployment request, receiving an indication indicating that the trigger condition is satisfied based on trigger data stored at the first data source, the indication associated with a user of the no-code application;
   based on receiving the indication, executing the action response;
   after executing the action response, receiving action response data;
   storing the action response data at a second data source, the action response data comprising a correlation to the trigger data stored at the first data source; and
   notifying the user using the action response data.

2. The method of claim 1, wherein the first data source comprises a form database that stores form data.

3. The method of claim 2, wherein the trigger condition comprises the user submitting the form data that is stored at the first data source.

4. The method of claim 1, wherein the first data source is read only for the no-code application.

5. The method of claim 1, wherein the indication comprises an identifier identifying data stored at the first data source associated with satisfaction of the trigger condition.

6. The method of claim 1, wherein the operations further comprise synchronizing the second data source with the first data source via one-to-one row mapping.

7. The method of claim 1, wherein the action response comprises:
   generating an approval request; and
   transmitting the approval request to an approver associated with the user.

8. The method of claim 7, wherein the action response data comprises an approval response from the approver.

9. The method of claim 1, wherein notifying the user comprises generating a notification within at least one of a chat application or an email.

10. The method of claim 1, wherein the action response comprises:
   generating an approval request;
   transmitting the approval request to an approver associated with the user; and
   in response to receiving approval of the approval request, performing a post-approval action.

11. A system comprising:
   data processing hardware; and
   memory hardware in communication with the data processing hardware, the memory hardware storing instructions that when executed on the data processing hardware cause the data processing hardware to perform operations comprising:
      generating, by an author using a no-code application development environment, a no-code application, the no-code application comprising:
         a trigger condition associated with a first data source, the trigger condition satisfied by modifying data within the first data source; and
         an action response defining an action in response to the trigger condition being satisfied;
      receiving a deployment request requesting deployment of the no-code application within an application environment;
      after receiving the deployment request, receiving an indication indicating that the trigger condition is satisfied based on trigger data stored at the first data source, the indication associated with a user of the no-code application;
      based on receiving the indication, executing the action response;
      after executing the action response, receiving action response data;
      storing the action response data at a second data source, the action response data comprising a correlation to the trigger data stored at the first data source; and
      notifying the user using the action response data.

12. The system of claim 11, wherein the first data source comprises a form database that stores form data.

13. The system of claim 12, wherein the trigger condition comprises the user submitting the form data that is stored at the first data source.

14. The system of claim 11, wherein the first data source is read only for the no-code application.

15. The system of claim 11, wherein the indication comprises an identifier identifying data stored at the first data source associated with satisfaction of the trigger condition.

16. The system of claim 11, wherein the operations further comprise synchronizing the second data source with the first data source via one-to-one row mapping.

17. The system of claim 11, wherein the action response comprises:

generating an approval request; and transmitting the approval request to an approver associated with the user.

18. The system of claim 17, wherein the action response data comprises an approval response from the approver.

19. The system of claim 11, wherein notifying the user comprises generating a notification within at least one of a chat application or an email.

20. The system of claim 11, wherein the action response comprises:

generating an approval request;

transmitting the approval request to an approver associated with the user; and in response to receiving approval of the approval request, performing a post-approval action.

\* \* \* \* \*